March 31, 1964  JAMES E. WEBB  3,127,157
ADMINISTRATOR OF THE NATIONAL AERONAUTICS
AND SPACE ADMINISTRATION
MULTIPLE BELLEVILLE SPRING ASSEMBLY
Filed March 29, 1963

INVENTOR.
WILLIAM F. MacGLASHAN, JR.
BY
ATTORNEYS

3,127,157
MULTIPLE BELLEVILLE SPRING ASSEMBLY
James E. Webb, Administrator of the National Aeronautics and Space Administration, with respect to an invention of William F. MacGlashan, Jr.
Filed Mar. 29, 1963, Ser. No. 269,222
4 Claims. (Cl. 267—1)

This invention relates to multiple Belleville spring assemblies. A Belleville spring is in the form of a slightly conical disk formed of spring metal, and resists axially opposite forces applied at its inner and outer peripheries. It is customary to stack several Belleville springs. In this case, the outer periphery of the disk at one end and the inner periphery of the disk at the other end of the stack take the entire load, often causing plastic deformation of the end disks. The sliding friction between disks is substantial, resulting in large hysteresis effects. Sometimes the disks are separated by rings located between their outer margins. This reduces, but does not eliminate, the hysteresis effects; it does not cure the excess loads on the end disks.

A primary object of this invention is to provide a multiple Belleville spring assembly wherein the forces are essentially evenly distributed between a plurality of Belleville springs so that each spring carries only its share of the load.

A further object of this invention is to provide a multiple Belleville spring assembly which is particularly easy to assemble and disassemble.

A still further object is to provide a multiple Belleville spring assembly wherein one or more springs may be added or removed from the assembly to alter the resulting spring force.

With the above and other objects in view, as may appear hereinafter, reference is directed to the accompanying drawings in which.

Figure 1:
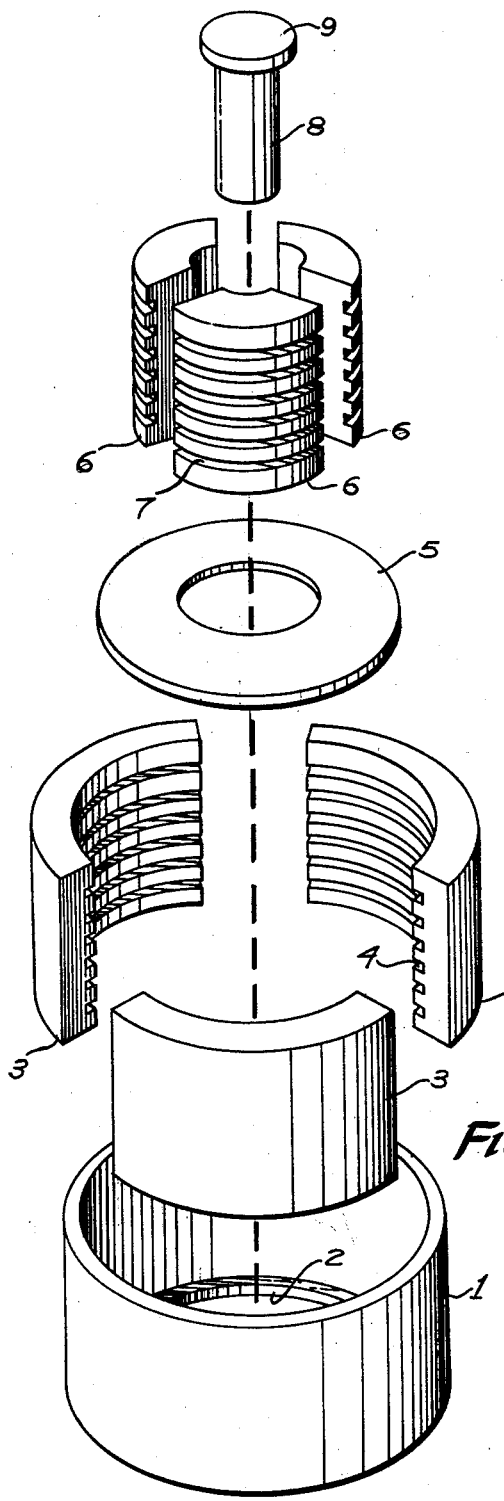
FIGURE 1 is an exploded view of the multiple Belleville spring assembly.
Figure 2:
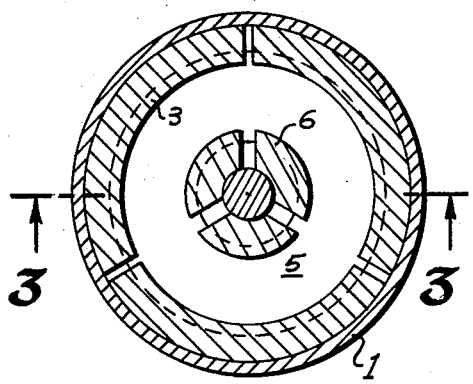
FIGURE 2 is a transverse, sectional view thereof taken through 2—2 of FIGURE 3.
Figure 3:
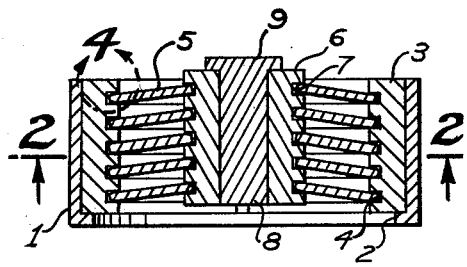
FIGURE 3 is a longitudinal, sectional view thereof taken through 3—3 of FIGURE 2.

The multiple Belleville spring assembly includes an outer cylindrical shell 1 having an inturned flange 2 at one end. Slidably fitting within the shell 1 is a segmental outer retainer 3 formed of three segments. The outer retainer 3 is provided with a series of equally spaced annular grooves 4. Each of the grooves 4 receives the outer margin of a Belleville spring 5 which is in the form of a disk having a central aperture.

The apertures of a series of Belleville springs fitted within the outer retainer 3 receive a segmental inner retainer 6 formed of three segments. The dimensions of the three segments are such that when in mutual contact they may be slipped axially through the series of Belleville springs.

The segments of the inner retainer 6 are provided with a series of grooves 7 which, when the segments of the inner retainer 6 are spread, receive the inner margins of the Belleville springs. The segments of the inner retainer 6 define a bore which receives a pin 8 to hold the segments in their spread condition, so as to interlock the inner retainer 6 and the Belleville springs. One end of the pin 8 is provided with a head 9.

The multiple Belleville spring assembly is assembled as follows:

The inner retainer 6 is inserted within the openings in a plurality of Belleville springs and the segments of the inner retainer 6 moved radially to interlock therewith, whereupon the pin 8 is inserted. The three segments of the outer retainer 3 are then placed about the group of Belleville springs in such a manner as to receive the outer peripheries thereof, and then the outer shell 1 is slipped over the outer retainer 3.

A shaft or bolt, or other means, whereby the assembly may be attached to other structures, may be substituted for the pin 8. Similarly, the outer shell 1 may form a part of the structure with which the Belleville spring is intended to cooperate, the essential feature being that there is provided a cylindrical receptacle for the segments of the outer retainer 3.

Figure 4:
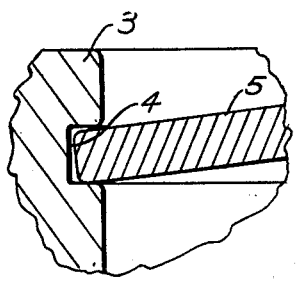
FIGURE 4 is a further enlarged, sectional view taken within circle 4 of FIGURE 3.

With special reference to FIGURE 4, it should be noted that the grooves 4 and 7 are, in fact, quite shallow, and that the peripheries of the Belleville springs are rounded to the extent of a few thousandths of an inch at their corners and are loosely received.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:
1. A multiple Belleville spring assembly, comprising:
 (a) a plurality of annular, conical, Belleville springs;
 (b) a segmental outer retainer having annular inturned grooves receiving the outer peripheries of said springs;
 (c) removable means securing the segments of said outer retainer against radial separation;
 (d) a segmental inner retainer having annular external grooves receiving the inner peripheries of said springs;
 (e) and removable means securing the segments of said inner retainer against radial contraction.
2. A multiple Belleville spring assembly, comprising:
 (a) a plurality of annular, conical, Belleville springs;
 (b) a segmental outer retainer having annular inturned grooves receiving the outer peripheries of said springs;
 (c) a sleeve surrounding said outer retainer securing the segments thereof against radial separation;
 (d) an annular segmental inner retainer having annular external grooves receiving the internal peripheries of said springs;
 (e) and a central pin inserted within said inner retainer securing the segments thereof against radial contraction.
3. A multiple Belleville spring assembly, comprising:
 (a) a plurality of annular, conical, Belleville springs;
 (b) an annular outer retainer divided into complementary segments for radial movement and having a series of parallel internal grooves receiving freely the outer peripheries of said springs;
 (c) a sleeve surrounding said outer retainer securing the segments thereof against radial separation;
 (d) an annular inner retainer divided into complementary segments for radial movement and having a series of parallel external grooves receiving freely the inner peripheries of said springs;

(e) and removable means securing the segments of said inner retainer against radial contraction.

4. A multiple Belleville spring assembly, comprising:
(a) a plurality of annular, conical, Belleville springs;
(b) an annular outer retainer divided into complementary segments for radial movement and having a series of parallel internal grooves receiving freely the outer peripheries of said springs;
(c) a sleeve surrounding said outer retainer securing the segments thereof against radial separation;
(d) an annular inner retainer divided into complementary segments for radial movement and having a series of parallel external grooves receiving freely the inner peripheries of said springs;
(e) and a central pin insertable within said inner retainer securing the segments thereof against radial contraction.

References Cited in the file of this patent

UNITED STATES PATENTS

| 3,098,643 | Ondrejka | July 23, 1963 |

FOREIGN PATENTS

| 539,327 | France | Mar. 31, 1922 |
| 536,164 | Italy | Nov. 24, 1955 |